US008111383B1

(12) United States Patent
Foley

(10) Patent No.: US 8,111,383 B1
(45) Date of Patent: Feb. 7, 2012

(54) PORTABLE LASER SURVEILLANCE METHOD OF A POINT ON A TARGET

(76) Inventor: Robert Foley, Roseville, MN (US)

( * ) Notice: Subject to any disclaimer, the term of this patent is extended or adjusted under 35 U.S.C. 154(b) by 216 days.

(21) Appl. No.: 12/688,042

(22) Filed: Jan. 15, 2010

(51) Int. Cl.
*G01C 3/08* (2006.01)

(52) U.S. Cl. ...................................................... 356/5.01

(58) Field of Classification Search .................. 356/5.01
See application file for complete search history.

(56) References Cited

U.S. PATENT DOCUMENTS 4,397,549 A * 8/1983 Morgan ....................... 356/5.01
5,299,971 A 4/1994 Hart
5,757,004 A 5/1998 Sandell et al.
5,910,767 A * 6/1999 Frucht ........................... 340/557
6,700,528 B2 * 3/2004 Williams et al. ................ 342/28
6,804,907 B1 * 10/2004 Slobodkin .................... 42/71.02
6,816,073 B2 * 11/2004 Vaccaro et al. ............... 340/541
2002/0060737 A1 5/2002 Hsieh et al.
2002/0175294 A1 * 11/2002 Lee et al. ................... 250/458.1
2004/0021770 A1 * 2/2004 Krill ............................. 348/117
2005/0030219 A1 * 2/2005 Friedrich et al. ................ 342/68
2008/0129581 A1 * 6/2008 Douglass et al. ............... 342/52
2008/0167835 A1 * 7/2008 Zank et al. .................... 702/151
2008/0252485 A1 * 10/2008 Lagassey ...................... 340/907
2009/0073034 A1 * 3/2009 Lin ......................... 342/357.07
2011/0026008 A1 * 2/2011 Gammenthaler ............... 356/28

OTHER PUBLICATIONS

Cunningham, Keith W., The use of Lidar for Change Detectio nand Updating of the CAMA Database, Journal of Property Tax Assessment and Administration, vol. 4, Issue 3, Mar. 2007.*
Holland, J. M., MDAR Interior Platform, Cybermotion Inc, Assocuation of Unmanned Vehicles Systems, Jul. 1995.*
Krill J.A.,M ultifunction Array Lidar Netwok of Intruder Detection, Tracking and Identification, Intelligent Sendors Networks and Information Processing, John Hopkins University Applied Physics Laboratory,2010.*

* cited by examiner

*Primary Examiner* — Thomas Tarcza
*Assistant Examiner* — Antoine J Bedard
(74) *Attorney, Agent, or Firm* — Sherrill Law Offices, PLLC

(57) ABSTRACT

A method for surveillance of a point on a target. A portable device is obtained, which includes: a laser range finder operable for measuring distances between the laser range finder and a target, an alarm operable for generating a perceptible signal, and a microcontroller. The microcontroller is configured and arranged to receive an initial distance value and subsequent distance measurements from the laser range finder and compare the values wherein an alarm is triggered id the change in the values is within a specified range. Subsequent steps include statically positioning and operating the device to measure the distance to an object comprising a moveable obstruction to an ingress or egress and monitoring the generation of any signal by the device indicative of movement of the object to permit ingress or egress.

12 Claims, 5 Drawing Sheets

PORTABLE LASER SURVEILLANCE METHOD OF A POINT ON A TARGET

BACKGROUND

Law enforcement personnel and private investigators conduct surveillance activities on people in order to document their specific activities. For the most part, a large volume of surveillance is conducted in the area of "rolling surveillance". This type of surveillance is where the agent sits in a motor vehicle and watches out tinted windows of a mini van or other similar vehicle. Usually they are watching a residence or other structure from some distance away, waiting for the subject of interest to leave, come into view or conduct certain activities to be documented for later evaluation and/or prosecution. Law enforcement agents sit and watch for hours at a specific area, usually a door to a dwelling or a vehicle parked in the driveway waiting for activity or departure. This type of surveillance can go on for days causing eyestrain, fatigue and frustration.

Motion detection systems in use today are inaccurate over long distances for motion monitoring of a specific point on a specific target. Several systems offer sweeping detection of an entire area for the change in fields to detect movement. Some of these also have trigger mechanisms to start video recorders automatically. However, these devices are not self-contained and capable of being aimed or pointed at a specific target for detecting movement of a specific area only and generating a perceptible alert signal.

U.S. Pat. No. 6,700,528 to Christopher R. Williams relates to the detection of a wide area under observation. Specifically, ice flows in rivers or ice sheets or rubble fields. The portable laser device is mounted proximate the target surface with orientation to laterally and elevation to identify detection of movement. Therefore, this device is designed for the detection of a large area of mass including ice sheets flowing down rivers and the like. The system is then designed to contact a responsible party by means of cell phone signal or similar device. It is not designed to detect the specific movement of one small area not larger than 2 square feet.

U.S. Pat. No. 5,299,971 to Frank J. Hart describes an interactive tracking device for detecting intruders with a single quadruplex stationary passive infrared sensor. The sensor provides a signal to a microcontroller which drives a stepper motor to rotate additional sensors with narrower fields of view to more precisely determine the exact bearing of the intruder. When an intruder is verified, a camera and/or light are activated to record the intruder. This device is designed for a larger area and "sweeps" the covered area for movement and not designed to be aimed at a specific target of a small size to detect the precise movement necessary to avoid false alerts to the operator.

U.S. Pat. No. 5,299,971 to Frank J. Hart describes an interactive tracking device for detecting intruders with a single quadruplex stationary passive infrared sensor. The sensor provides a signal to a microcontroller, which drives a stepper motor to rotate additional sensors with narrower fields of view to more precisely determine the exact bearing of the intruder. When an intruder is verified, a camera or lights are activated to record the intruder. This device too is designed for a larger area and "sweeps" the covered area for movement and not designed to be aimed at a specific target of a small size to detect the precise movement necessary to avoid false alerts to the operator.

U.S. Pat. No. 5,757,004 to Donald R. Sandell & Wade Lee May 26, 1998 describes a motion detector with a lens-sensor mounting and adjustment arrangement that permits a user to adjust the effective range of the motion detector without alerting the sensor's sensitivity settings. The mounting arrangement provides for relative movement of the sensor in relation to the lens matrix through an adjustment accessible to the user. The primary use of this device is to detect movement in an "area" covered in the field by the sensor such as a room or portion of an outside yard perhaps. The sensitivity setting or range is to shorten the distance of the effective range and not necessarily making it more pin-point.

In other words, if you were to take a flashlight beam that gets wider and wider as it travels from the source, you would be simply shortening the distance in which it illuminates without altering how sensitive it is.

U.S. Patent Application Publication US2002/0060737, 2002 to Chun-Hsing Hsieh & Yuan-Jen Hsiao relates to the method of detecting motion for a digital camera. A method of detecting motion is described by capturing a first image and transferring it into a control device. This image is then stored with real-time gray scale values so that subsequent images taken can be compared to the first value to identify changes or movement. This device is not designed to be aimed at a specific target of small size.

Currently, law enforcement personnel conduct surveillance by simply watching their target. This is usually done from a safe distance with the help of binoculars, monocular, or some other similar instrument. This method of surveillance has multiple drawbacks. First of all, while watching their target, the surveillance personnel lose the ability to multitask. Secondly, the risk of missing an activity (at the target) becomes high when the personnel momentarily take their eyes off the target, or take a break. Third, through constantly monitoring the target, surveillance personnel can succumb to fatigue and frustration due to eye strain.

Hence, a strong need exists for a detection device that will consistently and accurately detect small movements on a target without continuous human monitoring.

SUMMARY OF THE INVENTION

A method for surveillance of a target which comprises the step of obtaining a portable device, which includes: a laser range finder operable for measuring distances between the laser range finder and a target, an alarm operable for generating a perceptible signal, and a microcontroller. The microcontroller is configured and arranged to receive an initial distance value and subsequent distance measurements from the laser range finder and compare the values wherein an alarm is triggered id the change in the values is within a specified range. Subsequent steps include statically positioning and operating the device to measure the distance to an object comprising a moveable obstruction to an ingress or egress and monitoring the generation of any signal by the device indicative of movement of the object to permit ingress or egress.

FIGS. $\mathbf{3}_A$ and $\mathbf{3}_B$ depicts emitting a laser beam from a vehicle to an obstruction objected of a point of ingress or egress.

Figure 4:
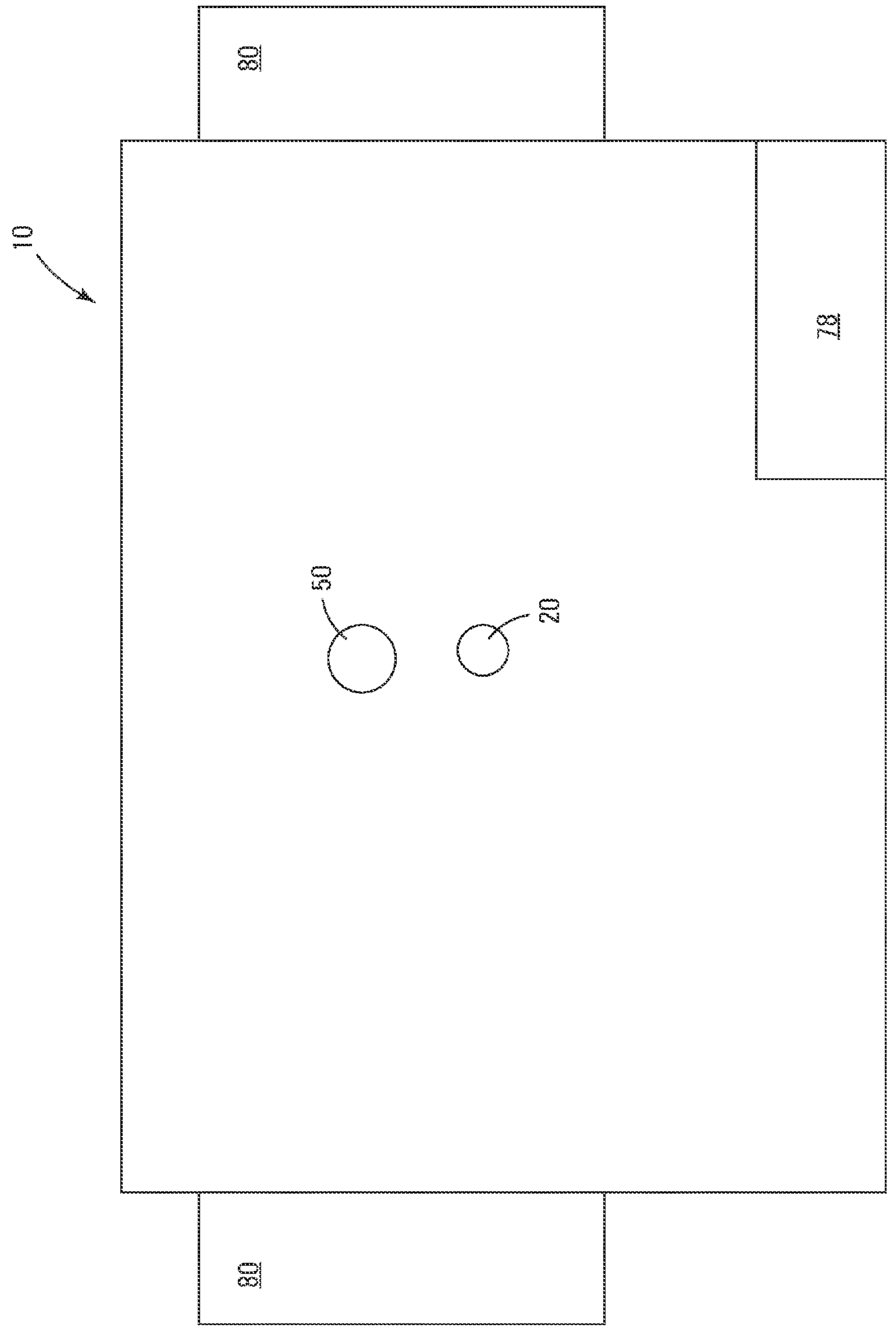

FIG. 4 is a front view of one embodiment of the portable laser device.

Figure 5:
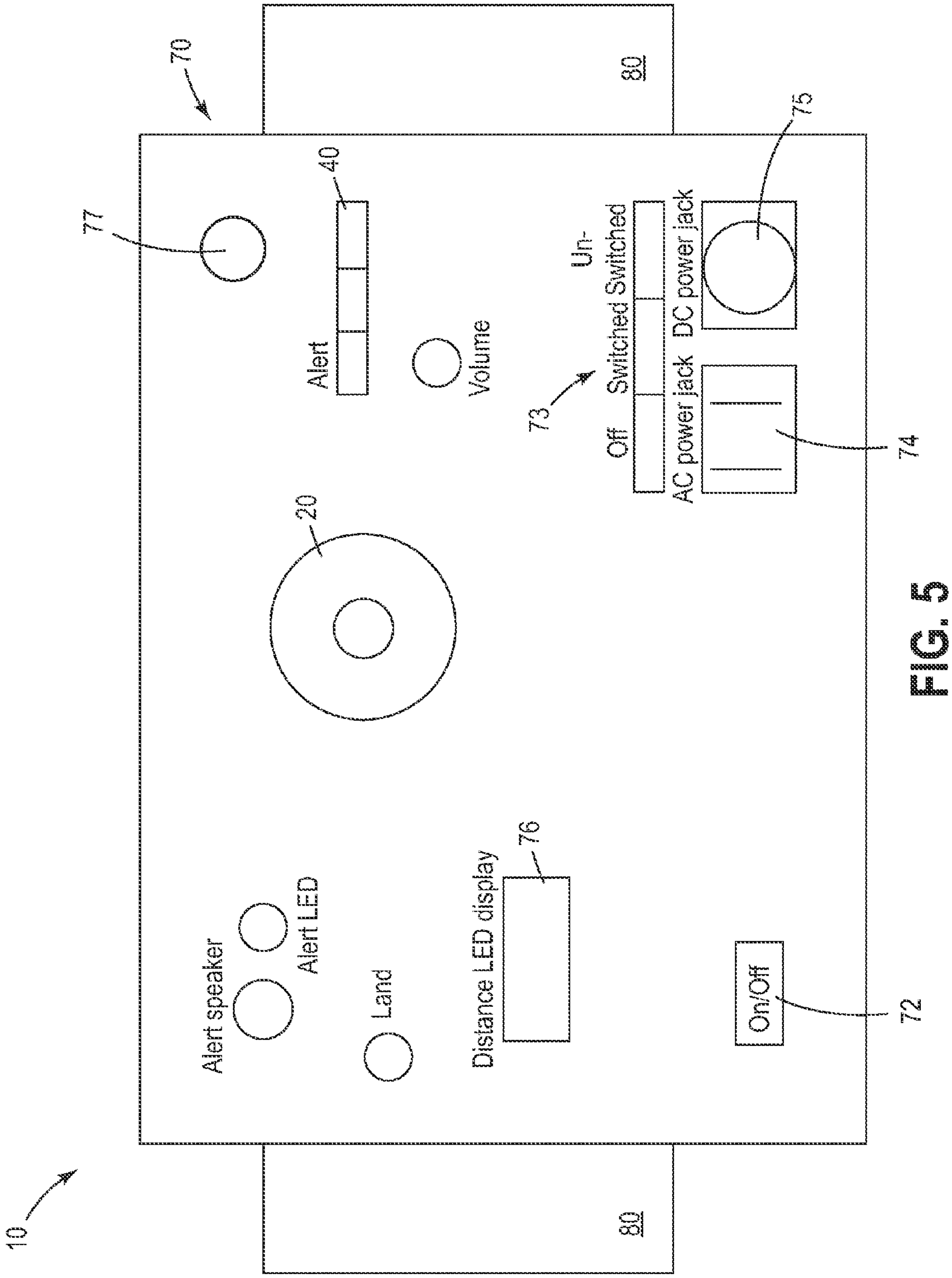

FIG. 5 is a rear view of one embodiment of the portable laser device.

DETAILED DESCRIPTION OF A PREFERRED EMBODIMENT

| Nomenclature | |
|---|---|
| 10 | Portable Device |
| 12 | Housing |
| 20 | Laser Range Finder |
| 22 | Laser Diode Module |
| 24 | Photodiode |
| 26 | Laser Beam |
| 28 | Amplifier |
| 30 | Microcontroller |
| 40 | Alarm |
| 50 | Scope |
| 60 | Power Supply |
| 70 | User Interface |
| 72 | Power Switch |
| 73 | Three-Way Reset Switch |
| 74 | A/C Power Jack |
| 75 | D/C Power Jack |
| 76 | Distance Display |
| 77 | Calculation Button |
| 78 | Battery Compartment |
| 80 | Hand Grips |
| 100 | Ingress or Egress |
| 102 | Obstruction Object |
| 110 | Auxiliary Device |
| 112 | Camcorder |
| 114 | Computer |

As depicted in FIGS. 1-5, the invention is directed to a method of surveillance with a portable device 10 of a moveable obstruction object 102 to a specific point of ingress or egress 100 to a building or vehicle. The portable device 10 will emit a laser beam 26 to target the obstruction object 102. The laser beam 26 measuring the distance from the portable device 10 to the obstruction object 102 is received back at the portable device 10, amplified and sent to an internal microcontroller 30. An initial distance value or reference value is stored within the electronic memory of the microcontroller 30. Subsequent distance measurement values are received and read at the microcontroller 30. If the change between the initial distance value and the subsequent distance measurement value is within the predetermined measurable range the microcontroller 30 will trigger an alarm 40. This allows the user to not constantly focus on the obstruction object 102 when no activity is present and be alerted when a change within the specified range occurs. The laser range finder 20, microcontroller 30 and alarm 40 are in electrical connection and encapsulated in a housing 12.

Figure 1:
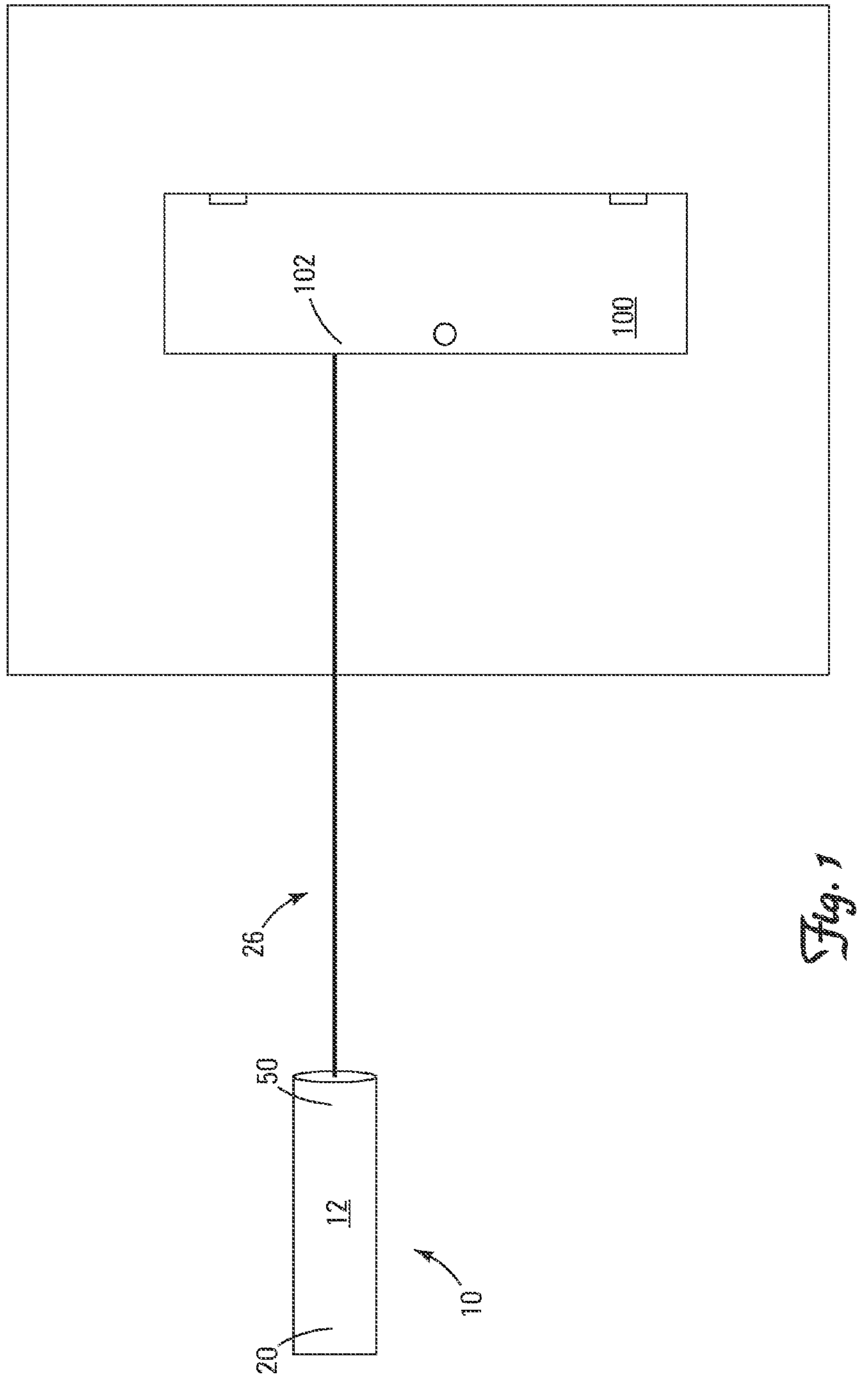
FIG. 1 depicts one embodiment of the present invention wherein the portable laser device emits a laser beam to an obstruction object blocking a point of ingress or egress.

As depicted in FIG. 1, the laser beam 26 is emitted from the portable device 10. In the present embodiment the laser beam 26 targets the obstruction object 102 blocking a specific point of ingress or egress 100. By aiming the laser at the obstruction object 102 the portable device will alert the user when a movement in the obstruction object 102 occurs. A user may monitor if a person enters or leaves a particular premises or vehicle based on the movement of the obstruction object 102. The obstruction object 102 may include, but not limited to, a residential door or window, an overhead garage door or vehicle doors. Any barrier blocking the ingress or egress 100 of an establishment or vehicle may be monitored. A perceptible signal from the alarm 40 is triggered when activity is detected. The perceptible signal from the alarm 40 may be a visual, audio or vibrational alert to get the attention of the user that a change has occurred and human visual surveillance is suggested.

The portable device 10 is designed and encased in a plastic or metal housing 12 of sufficient strength durable enough to withstand transportation within a trunk of a moving vehicle. The portable device 10 is self-contained, not dependent on any other external devices for its surveillance operation. This allows for easy transportation, set-up and surveillance by a single user.

Figure 2:
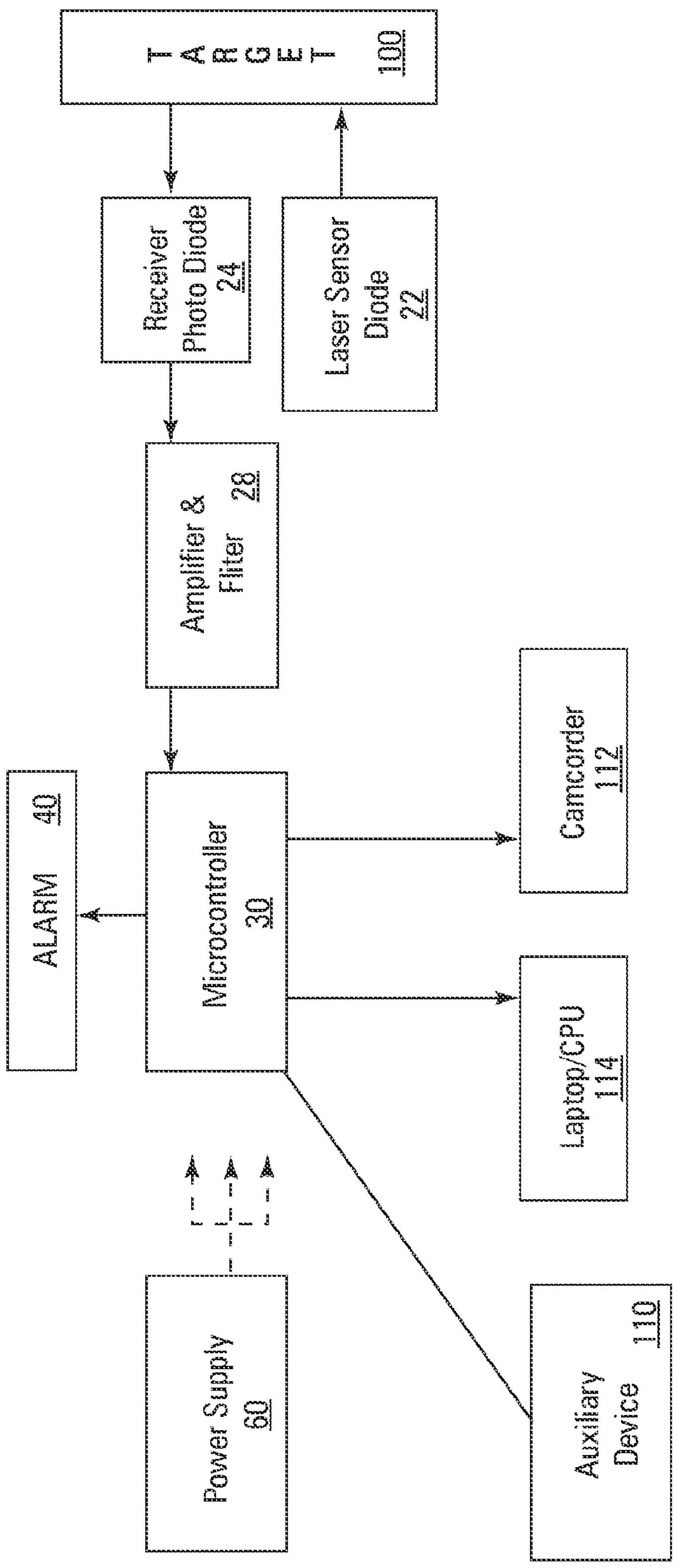
FIG. 2 is a flow diagram of the method of emitting the laser beam to a target.
Figure 3A:
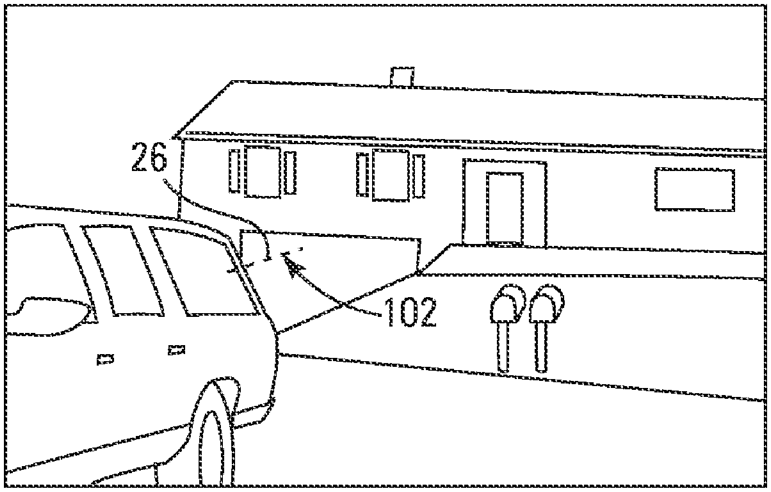
Figure 3B:
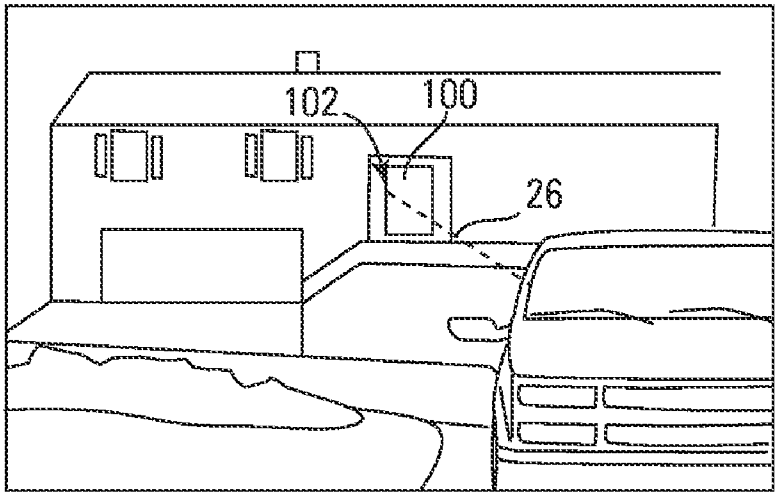

As depicted in FIGS. 1-3$_B$, the laser beam 26 from the portable device 10 is focused on an obstruction object 102 blocking a specific point of ingress or egress 100. The laser beam 26 monitors the obstruction object 102. Movement of the obstruction object 102 blocking the ingress or egress 100 of a particular structure such as a building or vehicle may indicate that a person is entering or leaving. The alarm 40 alerts the user of movement of the obstruction object 102.

The laser beam 26 is received using a photodiode 24. A targeting scope 50 is used to focus the reflected portion of the laser beam 26 on to the photodiode 24 and the same scope 50 may be used to aim the laser beam 26. The received signal goes through an amplifier 28 before going into the microcontroller 30. The microcontroller 30 calculates if a change in distance from the portable device 10 and the obstruction object 102 has occurred. If such a change is detected and within a specified range the alarm 40 alerts the user. A band pass filter may be used to eliminate unwanted light reflected weakening the signal.

Several types of signals were considered for surveillance of the obstruction object 102. Doppler radar was considered but the receiving antenna would have to be huge and cumbersome in order to receive a pin-point signal accurate to 900 feet. Image processing using still or video imagery were also considered. Although this method certainly has possibilities with the digital age it requires a unit to feed the signal into a control device such as a separate operational computer. Failure of a separate electrical component or a hard wired or wireless connection would then render the portable device 10 useless.

Furthermore, the portable device 10 is designed to be transported by a compact unit within a single housing 12 allowing for easier set up and transportation by a single user. A connection to a computer 114 or other auxiliary device 110 is an option available to the portable device 10 if the user wished to track data, but is not be required for operation.

In a first embodiment depicted in FIGS. 1-3$_B$, the portable device 10 detects movement of the obstruction object 102 of the ingress or egress 100 by measuring the intensities of the reflected portions of the laser beam 26 and comparing them with a predetermined or calculated initial distance value or reference value. The laser range finder 20 includes a laser diode module 22 to emit the continuous modulating laser beam 26 at the obstruction object 102. The reflected portion of the laser beam 26 is received at the scope 50 and focused on the photodiode 24. Examples of a receiving photodiode 24 include, but are not limited to, a semiconductor diode which the reverse current varies with illumination, such as, an alloy junction photocell and the grown junction photocell.

The output signal of the receiving photodiode 24 enters the amplifying and filtering circuits through an amplifier 28. For example, a trans-impedance amplifier converts current into voltage and amplifies it. The photodiode 24 is connected to the input of the amplifier 28, which converts the current from the photodiode 24 into voltage. The output of the amplifier 28 may go through more amplification stages before being sent to the microcontroller 30 such as non-inverting amplifier stages used to increase the signal strength into the microcontroller 30. Low and high frequency filters may be used to filter high frequency or ambient noise for a cleaner signal.

Subsequent distance measurement values are collected and sent to the microcontroller 30. The intensity change between the reflected portion of the laser beam 26 and the reference value is calculated within the microcontroller 30. If the intensity change is determined to be within the specified range the microcontroller 30 triggers the alarm 40.

In the first embodiment the change in intensity is measured by the change in amplitude of the reflected portion of the laser beam 26. The reflected portion of the laser beam 26 is read and sent to the microcontroller 30, which compares its amplitude using an A/D converter. Examples of a microcontroller 30 functionality needed are serial communication, analog to digital conversion and adequate pins for triggering an auxiliary device 110. An example of an industry available controller is Microchip's PIC16F877A microcontroller 30 utilizing an 11 MHz oscillator and a MAX232 for serial communication. Other microcontrollers 30 with comparable functionality may be used to perform the necessary calculations. In order to log the time and date into a computer 114 or other auxiliary device 110, serial communication RS-232 using MAX232 chip may be used as the microcontroller 30 sends an array of characters through RS-232 to a communication port.

If the change in intensity is within a specified range the microcontroller 30 will trigger the alarm 40 alerting the user. A change in intensities that falls outside of the predetermined range may not trigger the alarm 40. The microcontroller 30 will either ignore the change and continue monitoring the obstruction object 102 or stop emitting the laser beam 26 and trigger the alarm 40 to notify the user that surveillance is no longer being performed.

The initial distance value or reference value is calculated or manually entered into the microcontroller 30. To calculate the reference value the microcontroller 30 may receive one measurement or a first set of initial measurements from the laser range finder 20. From the first measurements the microcontroller 30 may calculate the average, determine the median or mode of the values. One example of a reference value is taking the reference measurement with the largest amplitude out of one hundred measurements. The process is repeated as desired with the largest amplitude selected. An average of the largest amplitude values is taken and stored within the memory function of the microcontroller 30. Alternatively, a plurality of measurements over a time period may be averaged. For example, measurements are taken every 2 ms for 5 seconds and then averaged for the reference value.

Additionally, a single measurement value may be used. For example, a cycle of reference values may be used such that each measurement is compared to the measurement taken immediately prior. In such a case each first measurement is compared to the second subsequent measurement, the microcontroller 30 then uses the second subsequent measurement as the reference value and compares it the next subsequent measurement. In this case the reference value is constantly updated and the subsequent distance measurement is compared to measurement immediately preceding it. If the change in consecutive measurements falls within a specified range the alarm 40 is triggered.

Once an initial distance value or reference value is determined subsequent distance measurements are taken. The subsequent distance measurements may be a calculated average or a determined median or mode in the same manner as the initial distance value or reference value.

The microcontroller 30 compares the reference value and subsequent distance measurements which are a second set of measured values from the laser range finder 20. The second set of measurement values are the values continuously read from the laser range finder 20 which will indicate if the position or distance to the obstruction object 102 has moved. The reference value from the reflected portion of the laser beam 26 and the subsequent distance measurements are compared in order to see if the difference is greater that a threshold or specified range stored within the microcontroller 30.

The specified range may be entered into the microcontroller 30 indicting the range where the measurement must fall in order to trigger the alarm 40. Buffer zones outside of the specified range indicate ranges where the microcontroller 30 ignores the measurements and does not trigger the alarm 40. A specified measureable range is defined within the microcontroller 30. In one example the buffer range is 0-0.5 V. The alarm 40 and/or the auxiliary devices 110 are triggered if the three consecutive second set measurements deviate from the reference value by more than the threshold of 0.5V, deviations of 0-0.5 V are ignored. Alternatively, the specified range could be set at a calculated distance range greater than 1 foot and less than 10 feet. This range is the approximate distance a door would open to allow a person to enter or leave while ignoring disruptions in the laser beam 26 from passing cars. Generally, the obstruction object 102, a door in this example, is monitored from across a street or more than 100 feet away. By ignoring breaks in the laser beam 26 occurring over 10 feet from the obstruction object 102, the user limits the potential false readings.

The obstruction object 102 to the a place of ingress or egress 100, may include: a residential door such as a front, side or back door leading to a building, a window or garage door has been opened to allow a person or vehicle to exit. Movement of the obstruction object 102 is indicated by the changes subsequent distance measurements and the initial distance value or reference value. A vehicle or person may also have disrupted the laser beam 26 from contacting the obstruction object 102, thus triggering the alarm 40. A user will then make a visual inspection to determine if someone is entering or exiting the particular premises. Alternatively, buffer zones may be programmed to instruct the portable device 10 to ignore passing motorists or individuals. Disruptions in the laser beam 26 outside the specified range would not trigger the alarm 40. This program may be especially beneficial if surveillance is done from across a busy street so the user would not be burdened by constant false alarms due to passing vehicles.

Selection of the wavelength to be used is an important part of the design. Since the portable device 10 is meant for surveillance, detection of the laser beam 26 may be a concern, thus the invisible infrared laser beam 26 is desirable for continuous surveillance. However, a visible laser may also be used to aim an invisible laser beam 26 or perform the actual surveillance depending on the user's needs. With an invisible infrared laser beam 26 a person can end up unknowingly looking into it for a long amount of time damaging the eyes and cause a safety concern. To address such safety concerns the microprocessor 30 may be programmed to stop laser emission or trigger the alarm 40 if any change is detected. Furthermore, the laser diode module 22 may be driven at less than 5 mW which is eye safe for public use.

The laser beam 26 may be a modulated continuous laser wherein the modulation is a low frequency sine wave. The laser diode module 22 is used to emit the laser beam 26 at the obstruction object 102 of an ingress or egress 100. The emitted laser beam 26 is modulated and may be done by using a Schmitt trigger oscillator at a frequency of 5 MHz. The oscillator generates a square wave of 10V peak to peak amplitude. Output of the oscillator goes through a voltage dividing and biasing stage before being applied to the laser diode module 22 as a 1.8V-2.1V square wave. The modulation of the laser beam 26 is necessary to differentiate the reflected signal from common noise. Without modulation the reflected signal will be lost to common background noise making reading the signal difficult. For purposes of law enforcement or military surveillance an invisible emitted laser beam 26 is preferable.

The portable device 10 may also measure the distance to the obstruction object 102 using a time of flight laser measurement method. The time of flight ranging laser method uses lasers with short pulse duration and high peak power. It is commonly used for long distance measurement applications such as satellite and missile tracking and military range finding. These laser ranging systems are used to measure the distance between the source and a target. The time taken by the laser beam 26 to hit the obstruction object 102 and come back is measured. The velocity of light is converted to a distance from the portable device 10 to the obstruction object 102. The change in distance from the reference distance and the obstruction object 102 is calculated by the microcontroller 30 and the alarm 40 is triggered if the change is outside a specified range.

In yet another embodiment, the distance may be measured by the portable device 10 through the triangulation method where the laser beam 26 is emitted and the reflected portion of the laser beam 26 is collected in a lens adjacent to the emission point forming a triangle wherein the distance to the obstruction object 102 may be calculated.

As depicted in FIG. 1, the scope 50 is detachably attached to the housing 12 and used for aiming the emitting laser beam 26. The user may line up the laser beam 26 with the scope 50 and rely on the accuracy of the scope 50 to focus the invisible emitted laser beam 26. The scope 50 is also used to focus the reflected portion of the laser beam 26 on to the photodiode 24. From there the photodiode 24 reflected portion of the laser beam 26 goes through an amplification stage before going into the microcontroller 30 where it is compared against a reference value.

An auxiliary device 110 may be turned on, such as a camcorder 112 or computer 114 to log the date and time of the activity. Activity from other external auxiliary devices 110 would be left to the discretion of the user.

As depicted in FIGS. 4-5, the portable device 10 may be powered by a power supply 60, such as a battery or an electrical connection. For example a 14.4V or 9V battery or 12 volts D/C and 110 volts A/C with and internal rechargeable battery with sufficient power so as to run the portable device 10 for a minimum of 3 hours. It will also have a 12-volt D/C power cord that will allow the portable device 10 to be powered by an auxiliary jack such as a cigarette lighter or D/C jack on a large power pack. A 110 volt A/C power cord may be included to allow the portable device 10 to be powered by A/C current when used with a power converter or when used inside a structure with standard A/C current. Both the A/C and D/C power cords will be of a plug in design so that they can be removed from the rear of the portable device 10 when they are not in use.

The portable device 10 has a user interface 70 to allow a user to operate and program as desired. A power switch 72 and a light or LED to indicate when the portable laser device 10 is powered is on the user interface 70. Also available are two power jacks an A/C power jack 74 and a 12 volt D/C power jack 75. A three-way reset switch 73 could allow the user to preset when the power jacks 74, 75 will have power. When the three-way reset switch 73 is in the "off" position, the two jacks 74, 75 will not have power at any time. When in the "switched" mode, the power jacks 74, 75 will only have power when the portable device 10 is on and in the set or surveillance mode or alerts. In this mode the power jacks 74, 75 will only get power when the portable device 10 triggers the alarm 40. The third switching position of the three-way reset switch 73 is the "un-switched" position. In the "un-switched" position power is supplied to the two power jacks 74, 75 so long as the portable device 10 is connected to a power supply 60 regardless if the portable device 10 is set to surveillance mode or alerts. A distance display 76 may show the change in the distance from the portable device 10 to the obstruction object 102.

As depicted in FIG. 4, the laser diode module 22 is in the center of the front of the housing 12. The bottom of the portable device 10 may mount on a standard tripod or dash mounting bracket (not shown). Securing the portable device 10 when monitoring an obstruction object 102 allows for more accurate distance measurements.

The bottom of the portable device 10 may also have the battery compartment 78. An auxiliary device 110 may be turned on, such as a camcorder 112 or computer 114 to log the date and time of the activity. Activity from other external auxiliary devices 110 would be left to the discretion of the user.

As depicted in FIG. 5, the rear of the portable device 10 may have the scope 50 in the center including cross hairs to position the emitted laser beam 26. A calculation button 77 to aim the portable device 10 appears on the user interface 70. The hand grips 80 on the left and right sides of the housing 12 may be designed as hand grips 80 for ease in holding and positioning the portable device 10. A three-way reset switch 73 allows the operator to place the portable device 10 in an auto reset mode after an alert or manual reset mode requiring the operator to reset the portable device 10. The auto reset mode allows the portable device 10 to reset in about five seconds after the portable device 10 returns to its pre-alert status.

The portable device 10 may be mounted onto a tripod or dash-mounting bracket (not shown) by means of the universal threads on the bottom of the portable laser device 10 or similar installation. The operator may mount the portable device 10 next to a camcorder 112, computer 114 or other auxiliary device 110.

In FIG. 5, a calculation button 77 on the user interface 70 of the portable device 10 would configure the reference values from the emitted laser beam 26 and set the parameters within the microcontroller 30. A user would press the calculation button 77 and emit the laser beam 26 setting a default point. The calculation button 77 will be pressed to indicate that the reference value is entered and subsequent distance measurements will be made and movement of the obstruction object 102 will be indicated. The portable device 10 may be designed and programmed to alert when movement occurs at the obstruction object 102 to the point of ingress or egress 100.

The foregoing discussion discloses and describes merely exemplary embodiments and aspects of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A method for surveillance of a target, comprising the steps of:

(a) obtaining a portable device, which includes:

(1) a laser range finder operable for measuring distances between the laser range finder and a target, (2) an alarm operable for generating a perceptible signal, and (3) a microcontroller in electrical communication with the laser range finder and the alarm, wherein the microcontroller is configured and arranged to:

(A) receive an initial distance value from the laser range finder, (B) receive a subsequent distance measurement value from the laser range finder, (C) compare the initial distance value and the subsequent distance measurement value to obtain a change value, (D) trigger the alarm to generate the signal when the change value is value is within a specified range, (b) statically positioning and operating the device to measure the distance to an object comprising a moveable obstruction to an ingress or egress, and (c) monitoring the generation of any signal by the device indicative of movement of the object to permit ingress or egress.

2. The method in claim 1 wherein the initial and subsequent distant values are calculated using a time of flight method of laser distance calculation.

3. The method in claim 1 wherein the initial and subsequent distant values represent a distance to the target calculated using a triangulation method of laser distance calculation.

4. The method of claim 1 wherein the object is selected from the group consisting of a window, a residential door, a garage door and a vehicle door.

5. The method of claim 1 wherein the initial distance value is a calculated average of a plurality of distance values.

6. The method of claim 1 wherein the initial distance value is a determined median of a plurality of distance values.

7. The method of claim 1 wherein the initial distance value is a determined mode of a plurality of distance values.

8. The method of claim 1 wherein the subsequent distance measurement value is a calculated average of a plurality of distance measurements.

9. The method of claim 1 wherein the subsequent distance measurement value is a determined median of a plurality of distance measurements.

10. The method of claim 1 wherein the subsequent distance measurement value is a determined mode of a plurality of distance measurements.

11. The method of claim 1 wherein the specified range of the change value is greater than one foot and less than 10 feet.

12. The method of claim 1 wherein the device is statically positioned more than 30 feet from the object comprising a moveable obstruction to the ingress or egress.

* * * * *